US009822283B2

(12) United States Patent
Inoue

(10) Patent No.: US 9,822,283 B2
(45) Date of Patent: *Nov. 21, 2017

(54) HOT MELT ADHESIVE

(71) Applicant: HENKEL AG & CO. KGAA, Duesseldorf (DE)

(72) Inventor: Kentarou Inoue, Osaka (JP)

(73) Assignee: HENKEL AG & CO. KGAA, Duesseldorf (DE)

( * ) Notice: Subject to any disclaimer, the term of this patent is extended or adjusted under 35 U.S.C. 154(b) by 320 days.

This patent is subject to a terminal disclaimer.

(21) Appl. No.: 14/211,481

(22) Filed: Mar. 14, 2014

(65) Prior Publication Data

US 2014/0199908 A1 Jul. 17, 2014

Related U.S. Application Data

(63) Continuation of application No. PCT/JP2012/074136, filed on Sep. 13, 2012.

(30) Foreign Application Priority Data

Sep. 16, 2011 (JP) .................................. 2011-203071

(51) Int. Cl.
| | | |
|---|---|---|
| C09J 153/02 | (2006.01) | |
| C09J 109/00 | (2006.01) | |
| C09J 123/12 | (2006.01) | |
| C09J 7/02 | (2006.01) | |
| C09J 7/04 | (2006.01) | |
| C08L 23/12 | (2006.01) | |
| C08L 53/02 | (2006.01) | |

(52) U.S. Cl.
CPC ............. *C09J 7/0203* (2013.01); *C08L 23/12* (2013.01); *C08L 53/02* (2013.01); *C09J 7/043* (2013.01); *C09J 109/00* (2013.01); *C09J 123/12* (2013.01); *C09J 153/02* (2013.01); *Y10T 428/2826* (2015.01); *Y10T 442/2746* (2015.04)

(58) Field of Classification Search
CPC ........ C09J 7/0203; C09J 7/043; C09J 109/00; C09J 153/02; C08L 53/02; C08L 23/12; Y10T 428/2826; Y10T 442/2746
USPC ........... 442/150, 151; 524/321, 505; 525/98; 428/349
See application file for complete search history.

(56) References Cited

U.S. PATENT DOCUMENTS

| | | | | |
|---|---|---|---|---|
| 4,286,077 A | * | 8/1981 | St. Clair | .............. C09J 153/025 524/505 |
| 4,361,672 A | * | 11/1982 | Agarwal | ................ C09J 123/20 524/483 |
| 5,418,052 A | * | 5/1995 | Sugie | ................... C09J 153/025 428/335 |
| 6,099,900 A | * | 8/2000 | Minamizaki | ........... C09J 7/0257 427/208.8 |
| 6,184,285 B1 | | 2/2001 | Hatfield et al. | |
| 6,627,723 B2 | | 9/2003 | Karandinos et al. | |
| 6,747,114 B2 | | 6/2004 | Karandinos et al. | |
| 6,887,941 B2 | | 5/2005 | Zhou | |
| 7,459,503 B2 | | 12/2008 | Kanamaru et al. | |
| 7,825,186 B2 | | 11/2010 | Bach et al. | |
| 8,366,865 B2 | | 2/2013 | Terfloth et al. | |
| 8,604,145 B2 | | 12/2013 | Boone et al. | |
| 8,653,169 B2 | | 2/2014 | Jiang et al. | |
| 2004/0039117 A1 | | 2/2004 | Kijima | |
| 2005/0014891 A1 | | 1/2005 | Quinn | |
| 2005/0059759 A1 | * | 3/2005 | Sajot | .................... C09J 153/025 524/271 |
| 2005/0159566 A1 | | 7/2005 | Minami et al. | |
| 2007/0117907 A1 | | 5/2007 | Bach et al. | |
| 2008/0081868 A1 | | 4/2008 | Jiang et al. | |
| 2009/0110925 A1 | | 4/2009 | Fukuda et al. | |
| 2010/0305259 A1 | | 12/2010 | Rodriguez et al. | |
| 2011/0021102 A1 | * | 1/2011 | Inoue | ..................... C09J 123/14 442/327 |
| 2013/0296476 A1 | * | 11/2013 | Yasui | ................. C09J 123/0853 524/524 |

(Continued)

FOREIGN PATENT DOCUMENTS

| | | |
|---|---|---|
| EP | 0285430 A2 | 10/1988 |
| EP | 1498432 A1 | 1/2005 |
| EP | 1637559 A1 | 3/2006 |

(Continued)

OTHER PUBLICATIONS

JP 2007-169531 A (2007), machine translation, JPO Japan Platform for Patent Information (J-PlatPat).*

*Primary Examiner* — Susannah Chung
*Assistant Examiner* — Josephine Chang
(74) *Attorney, Agent, or Firm* — Sun Hee Lehmann

(57) ABSTRACT

The present invention provides hot melt adhesives for disposable products. The hot melt adhesives may be applied at high-speed and at low temperature ranges. The hot melt adhesives also provide excellent adhesion to polyethylene and a nonwoven fabric. The hot melt adhesive comprises (A) a thermoplastic block copolymer, which is a copolymer of a vinyl-based aromatic hydrocarbon with a conjugated diene compound; and (B) a propylene homopolymer having a melting point of 100° C. or lower, which is obtainable by polymerizing propylene using a metallocene catalyst. The disposable products are produced at high-speeds and low temperature with the inventive hot melt, and therefore, the disposal products are produced efficiently and safely, and a nonwoven fabric and a polyethylene film of the disposable products are less likely to peel.

14 Claims, No Drawings

(56) References Cited

U.S. PATENT DOCUMENTS

| | | | |
|---|---|---|---|
| 2014/0199907 A1* | 7/2014 | Moriguchi | ............ C09J 123/12 442/149 |
| 2015/0017868 A1 | 1/2015 | Stafeil et al. | |

FOREIGN PATENT DOCUMENTS

| | | | |
|---|---|---|---|
| EP | 2113541 A1 | | 11/2009 |
| EP | 2290029 A1 | | 3/2011 |
| EP | 2081609 B1 | | 3/2012 |
| EP | 1498434 B1 | | 10/2013 |
| JP | 60120775 A | | 6/1985 |
| JP | 4077591 A | | 3/1992 |
| JP | 200196490 A | | 4/2001 |
| JP | 2002519474 A | | 7/2002 |
| JP | 2007169531 A | * | 7/2007 |
| JP | 2009242533 A | | 10/2009 |
| JP | 2012187361 A1 | | 10/2012 |
| WO | 0146278 A2 | | 6/2001 |
| WO | 0153408 A1 | | 7/2001 |
| WO | 2006004750 A1 | | 1/2006 |
| WO | 2012068576 A2 | | 5/2012 |
| WO | 2012068703 A1 | | 5/2012 |

* cited by examiner

US 9,822,283 B2

HOT MELT ADHESIVE

FIELD OF INVENTION

The present invention relates to a hot melt adhesive, and more particularly to a hot melt adhesive which is used in the field of disposable products typified by a diaper and a napkin.

BACKGROUND OF THE INVENTION

A synthetic rubber-based hot melt adhesive containing a thermoplastic block copolymer as a main component has widely been used as a hot melt adhesive which is used in disposable products such as a diaper and a napkin and is applied to a base material thereof, for example, a nonwoven fabric, a tissue, a polyethylene film and the like.

JP 2004-137297A discloses that a synthetic rubber-based hot melt adhesive containing a styrene-butadiene-styrene block copolymer as a main component can be employed in disposable products. In case of producing disposable products, a film or a nonwoven fabric is coated with a hot melt adhesive and high-speed coating is sometimes used so as to enhance production efficiency of the disposable products. In particular, it is necessary to increase a discharge amount of the hot melt adhesive so as to coat at a high speed in case of performing spiral coating. Therefore, it is necessary to set the pressure of hot air to be blown to a high value. However, in case of the synthetic rubber-based hot melt adhesive of JP 2004-137297A, the hot melt adhesive may be sometimes scattered under the high hot air pressure.

One of means for enhancing production efficiency of the disposable products includes a method in which an olefin-based hot melt adhesive typified by an ethylene-propylene copolymer is applied at a high speed.

WO 2001-096490A discloses that a propylene polymer can be used as a raw material for a hot melt adhesive. An olefin-based hot melt adhesive of WO 2001-096490A develops high adhesive strength in case of bonding a nonwoven fabric and a nonwoven fabric together. However, the adhesive is insufficient for the disposable products because of insufficient adhesion of the adhesive to a polyethylene film.

The disposable products such as a diaper and a sanitary napkin often have a structure in which an absorber constituted by a pulp, an absorbent polymer and the like is wrapped in a tissue and the outside of the tissue is covered with a nonwoven fabric, a polyethylene film and the like. Therefore, it is required for the hot melt adhesive for disposable products to have a strong adhesive strength to the nonwoven fabric and the polyethylene film.

JP 2009-242533A discloses a hot melt adhesive containing a hydrogenated styrene-isoprene block copolymer (SEPS) and polyolefin. The hot melt adhesive of JP 2009-242533A shows satisfactory adhesion to a nonwoven fabric, but shows poor adhesion to a polyethylene film because of rigid design containing no oil component in principle, and thus it is hard to use in disposable products. Furthermore, since the adhesive of JP 2009-242533A contains an amorphous polyolefin including a high-molecular weight component, it cannot obtain a sufficient width in spiral coating and has high viscosity. Therefore, it was not suited for spiral coating to a polyethylene film at low temperature. In order to cope with a complicated coating pattern, it is necessary to decrease the viscosity by increasing a coating temperature. However, when the coating temperature is increased, the film may be melted and the coated hot melt adhesive may shrink due to cooling, resulting in the formation of wrinkles in the film.

OBJECT OF THE INVENTION

The present invention provides a hot melt adhesive. The hot melt adhesive according to the present invention is suited for disposable products. An object of the present invention is to provide a hot melt adhesive which is excellent in high-speed coating and spiral coating at low temperature, and is also excellent in adhesion to a polyolefin film (preferably a polyethylene film) and a nonwoven fabric; and disposable products obtainable by using the hot melt adhesive.

SUMMARY OF THE INVENTION

The present inventors have intensively studied and found that it is possible to obtain a hot melt adhesive which is excellent in high-speed coating and is excellent in spiral coating at low temperature, and is also excellent in adhesion to a polyolefin film (preferably a polyethylene film) and a nonwoven fabric, when a propylene homopolymer having narrow molecular weight distribution and also having a low melting point is blended with a thermoplastic block copolymer, and that such a hot melt adhesive is suitable for use in disposable products. Thus, the present invention has been completed.

That is, the present invention provides, as an aspect, a hot melt adhesive including: (A) a thermoplastic block copolymer which is a copolymer of a vinyl-based aromatic hydrocarbon with a conjugated diene compound; and (B) a propylene homopolymer having a melting point of 100° C. or lower which is obtainable by polymerizing propylene using a metallocene catalyst.

The present invention provides, as an embodiment, the hot melt adhesive, wherein the thermoplastic block copolymer (A) contains at least one selected from: (A1) a hydrogenated styrene-butadiene block copolymer (SEBS); and (A2) a hydrogenated styrene-isoprene block copolymer (SEPS).

The present invention provides, as another embodiment, the hot melt adhesive, wherein the propylene homopolymer (B) includes at least one selected from: (B1) a propylene homopolymer having a weight average molecular weight of 60,000 or less; and (B2) a propylene homopolymer having a weight average molecular weight of more than 60,000.

The present invention provides, as a preferred embodiment, the hot melt adhesive, further including: (C) a tackifier resin; and (D) a plasticizer, wherein the plasticizer (D) contains at least one selected from: (D1) a naphthene oil; and (D2) a paraffin oil.

The present invention provides, as a second aspect, disposable products obtainable by using the above hot melt adhesive.

DETAILED DESCRIPTION OF THE INVENTION

Since the hot melt adhesive of the present invention includes: (A) a thermoplastic block copolymer which is a copolymer of a vinyl-based aromatic hydrocarbon with a conjugated diene compound; and (B) a propylene homopolymer having a melting point of 100° C. or lower which is obtainable by polymerizing propylene using a metallocene catalyst, the hot melt adhesive is excellent in high-speed coating and is excellent in spiral coating at low temperature, and is also excellent in adhesion to a polyolefin film (preferably a polyethylene film) and adhesion to a nonwoven fabric.

In the hot melt adhesive of the present invention, when the thermoplastic block copolymer (A) contains at least one selected from: (A1) a hydrogenated styrene-butadiene block copolymer (SEBS); and (A2) a hydrogenated styrene-isoprene block copolymer (SEPS), compatibility with the component (B) is improved, and because of improvement of the compatibility, an adhesive strength to a nonwoven fabric and a polyolefin film is improved.

In the hot melt adhesive of the present invention, when the propylene homopolymer (B) includes at least one selected from: (B1) a propylene homopolymer having a weight average molecular weight of 60,000 or less; and (B2) a propylene homopolymer having a weight average molecular weight of more than 60,000, the hot melt adhesive is more excellent in spiral coating at low temperature, and more excellent in balance of the adhesion to a polyolefin film and a nonwoven fabric.

When the hot melt adhesive of the present invention further includes: (C) a tackifier resin; and (D) a plasticizer, and the plasticizer (D) contains at least one selected from: (D1) a naphthene oil; and (D2) a paraffin oil, the adhesion to a polyolefin film and a nonwoven fabric is further improved, and the viscosity further decreases, and thus the hot melt adhesive is more excellent in coating at low temperature (especially, spiral coating) and is more suitable for use in disposable products.

Since disposable products of the present invention are obtainable by using the above hot melt adhesive, the disposable products can be efficiently produced using a high-speed coating line and coating can be performed at low temperature of about 140° C., which causes higher safety. The disposable products are excellent in adhesion to a nonwoven fabric and a polyolefin film, and are less likely to cause peeling.

The hot melt adhesive according to the present invention includes:
(A) a thermoplastic block copolymer which is a copolymer of a vinyl-based aromatic hydrocarbon with a conjugated diene compound; and
(B) a propylene homopolymer having a melting point of 100° C. or lower which is obtainable by polymerizing propylene using a metallocene catalyst.

In the present invention, the "(A) thermoplastic block copolymer" is a copolymer in which a vinyl-based aromatic hydrocarbon and a conjugated diene compound undergo block copolymerization, and is commonly comprised of a vinyl-based aromatic hydrocarbon block and a conjugated diene compound block. There is no particular limitation as long as the objective hot melt adhesive of the present invention can be obtained.

As used herein, the "vinyl-based aromatic hydrocarbon" means an aromatic hydrocarbon compound having a vinyl group, and specific examples thereof include styrene, o-methylstyrene, p-methylstyrene, p-tert-butylstyrene, 1,3-dimethylstyrene, α-methylstyrene, vinylnaphthalene, vinylanthracene and the like. Styrene is particularly preferable. These vinyl-based aromatic hydrocarbons can be used alone, or in combination.

The "conjugated diene compound" means a diolefin compound having at least a pair of conjugated double bonds. Specific examples of the "conjugated diene compound" include 1,3-butadiene, 2-methyl-1,3-butadiene (or isoprene), 2,3-dimethyl-1,3-butadiene, 1,3-pentadiene and 1,3-hexadiene. Among these conjugated diene compounds, 1,3-butadiene and 2-methyl-1,3-butadiene are particularly preferable. These conjugated diene compound can be used alone, or in combination.

The thermoplastic block copolymer (A) according to the present invention may be either an unhydrogenated or hydrogenated thermoplastic block copolymer.

Specific examples of the "unhydrogenated thermoplastic block copolymer (A)" include block copolymers in which blocks based on the conjugated diene compound are not hydrogenated. Specific examples of the "hydrogenated thermoplastic block copolymer (A)" include block copolymers in which blocks based on the conjugated diene compound are entirely or partially hydrogenated.

A proportion that the "hydrogenated thermoplastic block copolymer (A)" is hydrogenated can be indicated by a "hydrogenation ratio". The "hydrogenation ratio" of the "hydrogenated thermoplastic block copolymer (A)" refers to a proportion of double bonds converted into saturated hydrocarbon bonds by hydrogenation of all aliphatic double bonds included in the blocks based on the conjugated diene compound. The "hydrogenation ratio" can be measured by an infrared spectrophotometer, a nuclear magnetic resonance spectrometer and the like.

Specific examples of the "unhydrogenated thermoplastic block copolymer (A)" include a styrene-isoprene block copolymer (also referred to as "SIS") and a styrene-butadiene block copolymer (also referred to as "SBS"). Specific examples of the "hydrogenated thermoplastic block copolymer (A)" include a hydrogenated styrene-isoprene block copolymer (also referred to as "SEPS") and a hydrogenated styrene-butadiene block copolymer (also referred to as "SEBS").

These thermoplastic block copolymers (A) can be used alone, or in combination.

It is possible to use, as the thermoplastic block copolymer (A), commercially available products.

Examples thereof include Asaprene T439 (trade name), Asaprene T436 (trade name), Asaprene T438 (trade name), Asaprene N505 (trade name), TAFTEC H1121 (trade name), TAFTEC H1062 (trade name), TAFTEC H1052X (trade name) and TUFPREN T125 (trade name) manufactured by Asahi Kasei Chemicals Corporation; TR2003 (trade name), TR2500 (trade name) and TR2600 (trade name) manufactured by JSR Corporation; Stereon 857 (trade name) and Stereon 841A (trade name) manufactured by Firestone; Kraton D1118 (trade name), Kraton G1654 (trade name) and Kraton G1726 (trade name) manufactured by Kraton Polymers; Sol T166 (trade name) manufactured by Enichem; Quintac 3433N (trade name) and Quintac 3421 (trade name) manufactured by Zeon Corporation; and SEPTON 2002 and SEPTON 2063 (trade name) manufactured by Kuraray Co., Ltd.

These commercially available products of the thermoplastic block copolymer (A) can be respectively used alone, or in combination.

The styrene content of the thermoplastic block copolymer (A) is preferably 20% by weight or less, and particularly preferably from 10 to 15% by weight. The styrene content refers to the proportion of styrene blocks included in (A). When the styrene content is 20% by weight or less, compatibility of the component (A) with the component (B) is improved, and thus the adhesive strength to a nonwoven fabric and a polyolefin film (preferably a polyethylene film) of the obtained hot melt adhesive is more improved.

In the present invention, the propylene homopolymer (B) refers to a homopolymer of propylene, which is produced by using a metallocene catalyst as a polymerization catalyst. The melting point of the propylene homopolymer (B) is 100° C. or lower, more preferably from 60 to 90° C., and most preferably from 65 to 85° C.

The melting point refers to a value measured by differential scanning calorimetry (DSC). Specifically, after weighing 10 mg of a sample in an aluminum container, the measurement is carried out at temperature rise rate of 5° C./minute using DSC6220 (trade name) manufactured by SII NanoTechnology Inc, and the temperature of a top of a fusion peak refers to the melting point.

When propylene is polymerized using a metallocene catalyst, a propylene homopolymer having (i) crystallinity and (ii) very narrow molecular weight distribution is synthesized.

Crystallinity, (i), means that complete isotacticity and syndiotacticity can be optionally controlled. Therefore, a polymer, in which arrangement, ratio and the like of methyl groups is uniform, is obtained without causing deviation of crystallinity, and a low crystalline site that can cause decrease in adhesive force is less likely to be formed.

With respect to (ii), when molecular weight distribution of the propylene homopolymer (B) is indicated by polydispersity (Mw/Mn), it is from 1 to 3. The propylene homopolymer having polydispersity of from 1 to 3 is excellent in spiral coatability. The molecular weight distribution is a concept which indicates distribution of a molecular weight of a synthetic polymer, and a ratio (Mw/Mn) of a weight average molecular weight (Mw) to a number average molecular weight (Mn) serves as an indicator. In the present invention, the molecular weight distribution is measured by gel permeation chromatography (GPC).

Examples of the propylene homopolymer (B) include: (B1) a propylene homopolymer having a weight average molecular weight of 60,000 or less; and (B2) a propylene homopolymer having a weight average molecular weight of more than 60,000.

The weight average molecular weight of the propylene homopolymer (B1) is preferably 60,000 or less, particularly preferably from 30,000 to 60,000, and more preferably from 35,000 to 55,000.

The weight average molecular weight of the propylene homopolymer (B2) is more than 60,000, preferably more than 60,000 and 90,000 or less, and more preferably more than 60,000 and 80,000 or less.

The weight average molecular weight (Mw) means a value measured by gel permeation chromatography (GPC). Specifically, the value can be measured by using the following apparatus and measuring method. RI manufactured by Wators Corporation is used as a detector. TSKGEL GMHHR-H(S) HT manufactured by TOSOH CORPORATION is used as a GPC column. A sample is dissolved in 1,2,4-trichlorobenzene and allowed to flow at a flow rate of 1.0 ml/min and a measuring temperature of 145° C., and then the weight average molecular weight is determined by conversion of a molecular weight using a calibration curve derived based on polypropylene.

Since the number average molecular weight (Mn) is also determined by the same method, the molecular weight distribution is also calculated by GPC.

Examples of a commercially available product of the propylene homopolymer (B1) include L-MODU X400S (trade name) manufactured by Idemitsu Kosan Co., Ltd., and examples of a commercially available product of the propylene homopolymer (B2) include L-MODU X600S (trade name) manufactured by Idemitsu Kosan Co., Ltd.

When the hot melt adhesive of the present invention contains the thermoplastic block copolymer (A) and the propylene homopolymer (B), the spiral coatability at low temperature is excellent while maintaining the adhesion to a polyolefin film (preferably a polyethylene film) and a nonwoven fabric.

It is preferred that the hot melt adhesive of the present invention further includes: (C) a tackifier resin.

Examples of the tackifier resin (C) include a natural rosin, a modified rosin, a hydrogenated rosin, a glycerol ester of a natural rosin, a glycerol ester of a modified rosin, a pentaerythritol ester of a natural rosin, a pentaerythritol ester of a modified rosin, a pentaerythritol ester of a hydrogenated rosin, a copolymer of a natural terpene, a terpolymer of a natural terpene, hydrogenated derivatives of a copolymer of a hydrogenated terpene, a polyterpene resin, hydrogenated derivatives of a phenol-based modified terpene resin, an aliphatic petroleum hydrocarbon resin, hydrogenated derivatives of an aliphatic petroleum hydrocarbon resin, an aromatic petroleum hydrocarbon resin, hydrogenated derivatives of an aromatic petroleum hydrocarbon resin, a cyclic aliphatic petroleum hydrocarbon resin, and hydrogenated derivatives of a cyclic aliphatic petroleum hydrocarbon resin. These tackifier resins can be used alone, or in combination.

It is also possible to use, as the tackifier resin, a liquid type tackifier resin as long as it has a colorless to pale yellow color tone and has substantially no odor, and also has satisfactory thermal stability. Taking these characteristics into consideration comprehensively, the tackifier resin is preferably hydrogenated derivatives of resins, and particularly preferably a hydrogenated dicyclopentadiene-based resin.

It is possible to use, as the tackifier resin (C), commercially available products. Examples of these commercially available products include Alcon P100 (trade name) and Alcon M100 (trade name) manufactured by Arakawa Chemical Industries, Ltd.; Clearon M105 (trade name) manufactured by YASUHARA CHEMICAL CO., LTD.; ECR5400 (trade name) and ECR179EX (trade name) manufactured by Exxon Corporation; and Quinton DX395 (trade name) and Quinton DX390N (trade name) manufactured by Zeon Corporation. These commercially available tackifier resins can be used alone, or in combination.

The hot melt adhesive of the present invention can further include: (D) a plasticizer. The plasticizer (D) is blended for the purpose of decrease in melt viscosity of the hot melt adhesive, imparting flexibility to the hot melt adhesive and an improvement in wettability of the hot melt adhesive to an adherend. There is no particular limitation as long as the objective hot melt adhesive of the present invention can be obtained. Examples of the plasticizer (D) include paraffin oil, naphthene oil and aromatic oil, and colorless and odorless oils such as naphthene oil and paraffin oil are particularly preferable.

It is possible to use, as the plasticizer (D), commercially available products. Examples thereof include White Oil Broom 350 (trade name) manufactured by Kukdong Oil & Chemical Co., Ltd.; Diana Fresia S32 (trade name), Diana Process Oil PW-90 (trade name), DN oil KP-68 (trade name) and Process Oil NS100 (trade name) which are manufactured by Idemitsu Kosan Co., Ltd.; KN4010 (trade name) manufactured by PetroChina Company; Enerper M1930 (trade name) manufactured by BP Chemicals Ltd.; Kaydol (trade name) manufactured by Crompton Corporation; and Primol 352 (trade name) manufactured by Esso Corp. These plasticizers (D) can be used alone, or in combination.

In the hot melt adhesive of the present invention, the blending amount of the thermoplastic block copolymer (A) is preferably from 3 to 30 parts by weight, and more preferably from 5 to 20 parts by weight, based on 100 parts by weight of the total weight of the components (A) to (D). When the blending amount of the thermoplastic block copolymer (A) is from 3 to 30 parts by weight, the hot melt adhesive is more excellent in high-speed coating and spiral coating at low temperature, and balance of adhesion to a polyolefin film (preferably a polyethylene film) and a nonwoven fabric.

The blending amount of the propylene homopolymer (B) is preferably from 5 to 35 parts by weight, more preferably from 10 to 35 parts by weight, and particularly preferably from 20 to 30 parts by weight, based on 100 parts by weight of the total weight of the components (A) to (D). When the blending amount of the propylene homopolymer (B) is from 5 to 35 parts by weight, the hot melt adhesive is more excellent in the spiral coatability at low temperature while maintaining the adhesion to a polyolefin film (preferably a polyethylene film) and a nonwoven fabric.

The hot melt adhesive of the present invention may contain: (E) a wax. As used herein, the "wax" refers to an organic substance having a weight average molecular weight of less than 10,000, which is solid at normal temperature and becomes liquid when heated, and is commonly considered as a "wax". There is no particularly limitation on the wax as long as the hot melt adhesive according to the present invention can be obtained, if it has wax-like properties.

The wax (E) preferably contains: (E1) an olefin wax modified with carboxylic acid or carboxylic anhydride.

In the present invention, "(E1) olefin wax modified with carboxylic acid or carboxylic anhydride" refers to an olefin wax which is chemically, or physically processed with carboxylic acid or carboxylic anhydride, and there is no particular limitation as long as the objective hot melt adhesive of the present invention is obtainable. Examples of chemical or physical processing include oxidation, polymerization, blending, synthesis and the like.

Examples of the wax (E1) include a wax which is obtainable by graft polymerization of carboxylic acid or carboxylic anhydride with an olefin wax; and a wax which is obtainable by copolymerization of carboxylic acid or carboxylic anhydride on synthesizing an olefin wax by polymerization.

Therefore, the wax may be an olefin wax which is modified as a result of introduction of carboxylic acid or carboxylic anhydride into the "olefin wax" using various reactions.

There is no particular limitation on "carboxylic acid" and/or "carboxylic anhydride" to be used to modify the olefin wax as long as the objective hot melt adhesive of the present invention is obtainable.

Specific examples of the carboxylic acid or carboxylic anhydride include maleic acid, maleic anhydride, fumaric acid, fumaric anhydride, itaconic acid, acrylic acid, methacrylic acid and the like. These carboxylic acids and/or carboxylic anhydrides may be used alone, or in combination. Maleic acid and maleic anhydride are preferable, and maleic anhydride is particularly preferable.

If necessary, the hot melt adhesive according to the present invention may further contain various additives. Examples of the various additives include a stabilizing agent and a fine particle filler.

The "stabilizing agent" is blended so as to prevent decrease in molecular weight, occurrence of gelation, coloration, odor and the like of the hot melt adhesive due to heat, thereby improving stability of the hot melt adhesive, and there is no particular limitation as long as the objective hot melt adhesive of the present invention is obtainable. Examples of the "stabilizing agent" include an antioxidant and an ultraviolet absorber.

The "ultraviolet absorber" is used so as to improve light resistance of the hot melt adhesive. The "antioxidant" is used so as to prevent oxidative degradation of the hot melt adhesive. There is no particular limitation on the antioxidant and the ultraviolet absorber, as long as they are commonly used in disposable products and the below-mentioned objective disposable products are obtainable.

Examples of the antioxidant include a phenol-based antioxidant, a sulfur-based antioxidant and a phosphorus-based antioxidant. Examples of the ultraviolet absorber include a benzotriazole-based ultraviolet absorber and a benzophenone-based ultraviolet absorber. It is also possible to add a lactone-based stabilizer. These additives can be used alone, or in combination.

It is possible to use, as the stabilizer, commercially available products. Examples thereof include SUMILIZER GM (trade name), SUMILIZER TPD (trade name) and SUMILIZER TPS (trade name) manufactured by Sumitomo Chemical Co. Ltd.; IRGANOX 1010 (trade name), IRGANOX HP2225FF (trade name), IRGAFOS 168 (trade name) and IRGANOX 1520 (trade name) manufactured by Ciba Specialty Chemicals Inc.; and JF77 (trade name) manufactured by Johoku Chemical Co., Ltd. These stabilizers can be used alone, or in combination.

The hot melt adhesive for disposable products of the present invention can further include a fine particle filler. The fine particle filler may be commonly used fine particle filler, and there is no particular limitation as long as the objective hot melt adhesive of the present invention can be obtained. Examples of the "fine particle filler" include mica, calcium carbonate, kaolin, talc, titanium oxide, diatomaceous earth, urea-based resin, styrene beads, calcined clay, starch and the like. These particles preferably have a spherical shape, and there is no particular limitation on the size, (diameter in case of a spherical shape).

The hot melt adhesive for disposable products of the present invention can be produced by blending the components (A) and (B), optionally blending the components (C)-(E), if necessary blending the various additives, and melting the mixture with heating, followed by mixing. Specifically, the hot melt adhesive can be produced by charging the above components in a melt-mixing vessel equipped with a stirrer, followed by heating and mixing.

With regard to the hot melt adhesive for disposable products according to the present invention, a melt viscosity at 140° C. is preferably 8,000 mPa·s or less, more preferably from 2,000 to 7,000 mPa·s, and particularly preferably from 2,000 to 6,000 mPa·s. The "melt viscosity" is a viscosity of a melt of the hot melt adhesive and is measured by a Brookfield RVT-type viscometer (spindle No. 27).

By controlling the melt viscosity within the above range, the hot melt adhesive is suitable for low-temperature coating. Furthermore, the hot melt adhesive is uniformly applied to a nonwoven fabric and is likely to penetrate, and thus the adhesive is more suitably for use in disposable products.

As mentioned above, the hot melt adhesive according to the present invention can also be employed in paper processing, bookbinding, disposable products and the like, and it is suitably used in disposable products since it is excellent in adhesion to a nonwoven fabric and a polyolefin film (preferably a polyethylene film).

The disposable products can be constituted by coating at least one kind of a member selected from a group consisting of a woven fabric, a nonwoven fabric, a rubber, a resin, papers and a polyolefin film with the hot melt adhesive according to the present invention. The polyolefin film is preferably a polyethylene film for the reason of durability, costs and the like.

There is no particular limitation on the disposable products as long as they are so-called sanitary materials. Specific examples thereof include a paper diaper, a sanitary napkin, a pet sheet, a hospital gown, a surgical white garment and the like.

In the production line of the disposable products, various members (for example, tissue, cotton, nonwoven fabric, polyolefin film, etc.) of the disposable products are commonly coated with the hot melt adhesive. In case of coating, the hot melt adhesive may be discharged (or ejected) from various dischargers (or ejectors).

There is no particular limitation on the method of coating with the hot melt adhesive as long as the objective disposable products can be obtained. Such a coating method is roughly classified into a contact coating method and a non-contact coating method. The "contact coating" method refers to a coating method in which a discharger is brought into contact with a member or a film in case of coating with the hot melt adhesive, while the "non-contact coating" method refers to a coating method in which a discharger is not brought into contact with a member or a film in case of coating with the hot melt adhesive. Examples of the contact coating method include a slot coater coating method, a roll coater coating method and the like, and examples of the non-contact coating method include a spiral coating capable of coating in a spiral form, an omega coating or control seam coating method capable of coating in a wavy form, a slot spray coating or curtain spray coating method capable of coating in a plane form, and dot coating capable of coating in a dot form.

The hot melt adhesive of the present invention is suitable for spiral coating. The spiral coating method is a method in which an adhesive is applied by intermittent or continuous application, wherein the adhesive is applied in a spiral form using air without contact.

It is extremely useful for the production of the disposable products that the hot melt adhesive can be applied in a wide width by the spray coating. The hot melt adhesive capable of being applied in a wide width is capable of decreasing the coating width by adjusting the pressure of the hot air.

When it is difficult to apply the hot melt adhesive in a wide width, a lot of spray nozzles for obtaining sufficient bonding area are required, and thus it is unsuitable for the production of comparatively small disposable products such as a urine collection liner, and disposable products having a complicated shape.

Therefore, the hot melt adhesive of the present invention is suitable for the disposable products since the spiral coating can be performed in a wide width.

The hot melt adhesive of the present invention is useful for the production of disposable products because of satisfactory coatability at about 140° C. In case of coating with the hot melt adhesive at a high temperature, since a polyolefin film (preferably a polyethylene film) as a base material of the disposable products is melted and thermally shrinks, appearance of the disposable products is drastically impaired. In case of applying the hot melt adhesive at about 140° C., appearance of a nonwoven fabric and a polyolefin film (preferably a polyethylene film) as a base material of the disposable products scarcely changes and thus the appearance of the product is not impaired.

The hot melt adhesive of the present invention is suitable for the production of the disposable products within a short time since it is excellent in high-speed coatability. When the base material to be transported at a high speed is coated with the hot melt adhesive, breakage of the base material due to friction may arise in the contact type coating method. The hot melt adhesive of the present invention is suitable for the spiral coating as a kind of non-contact coating and is therefore suited for high-speed coating, and thus it is possible to improve the production efficiency of the disposable products. Furthermore, the hot melt adhesive of the present invention suited for high-speed coating hardly cause disorder of the coating pattern.

The hot melt adhesive of the present invention has satisfactory thermal stability and is uniformly melted in a high-temperature tank at 100 to 200° C. and does not cause phase separation. A hot melt adhesive having poor thermal stability easily cause phase separation of components in the high-temperature tank. The phase separation can cause clogging of a tank filter and a transfer piping.

Main embodiments of the present invention are shown below.

1. A hot melt adhesive including: (A) a thermoplastic block copolymer which is a copolymer of a vinyl-based aromatic hydrocarbon with a conjugated diene compound; and (B) a propylene homopolymer having a melting point of 100° C. or lower which is obtainable by polymerizing propylene using a metallocene catalyst.
2. The hot melt adhesive according to the above 1, wherein the thermoplastic block copolymer (A) contains at least one selected from: (A1) a hydrogenated styrene-butadiene block copolymer (SEBS); and (A2) a hydrogenated styrene-isoprene block copolymer (SEPS).
3. The hot melt adhesive according to the above 1 or 2, wherein the propylene homopolymer (B) includes at least one selected from: (B1) a propylene homopolymer having a weight average molecular weight of 60,000 or less; and (B2) a propylene homopolymer having a weight average molecular weight of more than 60,000.
4. The hot melt adhesive according to any one of the above 1 to 3, further including: (C) a tackifying resin; and (D) a plasticizer, wherein the plasticizer (D) contains at least one selected from: (D1) a naphthene oil; and (D2) a paraffin oil.
5. Disposable products obtainable by using the hot melt adhesive according to any one of the above 1 to 4.

Examples

The present invention will be descried for the purpose of describing the present invention in more detailed and specific manner by way of Examples. These are exemplary of the present invention and are not to be considered as limiting.

Components for blending a hot melt adhesive are shown below.

(A) Thermoplastic Block Copolymer
(A1) SEBS (having a styrene content of 12% by weight, manufactured by Asahi Kasei Chemicals Corporation under the trade name of TAFTEC H1221)
(A2) SEPS (having a styrene content of 13% by weight, manufactured by Kuraray Co., Ltd. under the trade name of SEPTON 2603)

(A3) SIS (having a styrene content of 16% by weight, manufactured by Zeon Corporation under the trade name of Quintac 3433N)

(A4) SBS (having a styrene content of 40% by weight, manufactured by Asahi Kasei Chemicals Corporation under the trade name of Asaprene T439)

(B) Propylene Homopolymer Having a Melting Point 100° C. or Lower which is Obtained by Polymerization Using a Metallocene Catalyst (B1) Crystalline propylene homopolymer having a melting point of 75° C. and a weight average molecular weight of 45,000, manufactured by Idemitsu Kosan Co., Ltd. under the trade name of "L-MODU X400S"

(B2) Crystalline propylene homopolymer having a melting point of 80° C. and a weight average molecular weight of 70,000, manufactured by Idemitsu Kosan Co., Ltd. under the trade name of "L-MODU X600S"

(B'3) Crystalline propylene homopolymer having a melting point of 145° C., manufactured by Clariant K.K. under the trade name of Licocene PP6102

(B'4) Crystalline ethylene/octene copolymer having a melting point 100° C., manufactured by Dow Chemical Company under the trade name of AFFINITY GA1950

(B'5) Crystalline ethylene/propylene copolymer having a melting point of 145° C., manufactured by Clariant K.K. under the trade name of Licocene PP2602

(B'6) Amorphous ethylene/propylene copolymer, manufactured by Huntsman Corp. under the trade name of REXtac 2304

(C) Tackifier Resin (C1) Hydrogenated tackifier resin, manufactured by Exxon Mobil Corporation under the trade name of ECR5400

(C2) Hydrogenated tackifier resin, manufactured by Exxon Mobil Corporation under the trade name of ECR179X (C3) Unhydrogenated tackifier resin, manufactured by Zeon Corporation under the trade name of Quintone DX395

(C4) Hydrogenated tackifier resin, manufactured by Arakawa Chemical Industries, Ltd. under the trade name of AlconM100

(C5) Liquid tackifier resin, manufactured by Maruzen Chemicals Co., Ltd. under the trade name of Maruca Clear-H (D) Plasticizer (D1) Naphthene oil, manufactured by Idemitsu Kosan Co., Ltd. under the trade name of Process oil NS100

(D2) Naphthene oil, manufactured by PetroChina Company under the trade name of KN4010

(D3) Paraffin oil, manufactured by Idemitsu Kosan Co., Ltd. under the trade name of Diana Process Oil PW90

(E) Wax (E1) Maleic acid-modified wax, manufactured by Clariant K.K. under the trade name of Licocene PP MA6252

(F) Additive (F1) Antioxidant, manufactured by ADEKA Corporation under the trade name of Adekastab AO60

These components were blended according to the formulations shown in Tables 1 and 2, and then melt-mixed at about 150° C. over 3 hours using a universal stirrer to prepare hot melt adhesives of Examples 1 to 7 and Comparative Examples 1 to 7.

With respect to the above respective hot melt adhesives, melt viscosity, peel strength and coatability were evaluated. Summary of the respective evaluations is shown below.

<Melt Viscosity (mPa·s)>

A hot melt adhesive was melted at 140° C. and 160° C. and, after 20 minutes, viscosity was measured by a No. 27 rotor using a Brookfield viscometer. The evaluation criteria are as follows.

Melt Viscosity at 140° C.

A: 2,000 mPa·s to 6,000 mPa·s

B: 1,000 mPa·s or more and less than 2,000 mPa·s, or more than 6,000 mPa·s and less than 10,000 mPa·s C: less than 1,000 mPa·s or 10,000 mPa·s or more Melt Viscosity at 160° C.

A: 500 mPa·s to 3,000 mPa·s

B: more than 3,000 mPa·s and 7,000 mPa·s or less

C: less than 500 mPa·s or more than 7,000 mPa·s

<Peel Strength Test>

(Production of Samples)

A nonwoven fabric was coated with a hot melt adhesive in a coating amount of 5 g/m$^2$. Using a slot coater, coating was carried out at a temperature of 140° C. The nonwoven fabric coated with the hot melt adhesive was laid on another nonwoven fabric through the hot melt adhesive, followed by pressing under a pressure of 0.5 kgf/cm to obtain a sample (nonwoven fabric/nonwoven fabric).

Furthermore, a nonwoven fabric coated with a hot melt adhesive was laid on a polyethylene (PE) film through the hot melt adhesive, followed by pressing under a pressure of 0.5 kgf/cm to obtain another sample (nonwoven fabric/PE film).

(Test Procedure)

Both the nonwoven fabric/nonwoven fabric sample and the nonwoven fabric/PE film sample were cut into a width of 25 mm in a direction (CD direction) vertical to the direction of movement of the base material, and then peel strength was measured by T type peeling using a universal tensile testing machine (manufactured by JT Toshi Inc.). The measurement was performed by a universal tensile testing machine under an environment of 20° C., 65% Rh and a peeling rate of 300 mm/minute.

Peel Strength between Nonwoven Fabric and PE Film

A: Average peel strength was more than 200 (g/25 mm).

B: Average peel strength was from 150 to 200 (g/25 mm).

C: Average peel strength between PE film and nonwoven fabric was less than 150 (g/25 mm).

Peel Strength between Nonwoven Fabric and Nonwoven Fabric

A: Material fracture (or base material failure)

B: Average peel strength is from 150 to 200 (g/25 mm).

C: Average peel strength is less than 150 (g/25 mm).

<Coatability>

Using a spiral spray manufactured by Nordson Corporation, a coating base material was coated with a hot melt adhesive to produce a laminate of the coated coating base material and an affixing (or laminating) base material, and coatability was evaluated. Both the coating base material and affixing base material are polyethylene terephthalate (PET) films.

More specifically, after setting at a temperature (i.e. coating temperature) at which melt viscosity of the hot melt adhesive becomes 5,000 mPa·s, the spiral spray (manufactured by Nordson Corporation) was mounted at a position (height of 30 mm from a PET film) and then the PET film as a coating base material was coated with the hot melt adhesive at an open time of 0.5 seconds in a coating weight of 15 g/m$^2$ while appropriately adjusting an air pressure, and the coated PET film was laid on a PET film as an affixing base material to produce a laminate (PET film/PET film), and then coatability was evaluated.

Spiral coatability was evaluated by confirming a coating width of the hot melt adhesive applied by the spiral coating. High-speed line coatability was evaluated by confirming a situation of scattering of the hot melt adhesive applied by the spiral coating.

Evaluation criteria are shown below.

Spiral Coatability

The coatability on the spiral coating (or spiral coatability) was evaluated by a balance between the air pressure of the spiral spray and the spiral width of the applied hot melt adhesive.

A: Spiral width of 15 mm was possible under the air pressure of 0.35 kgf/cm² or less.
B: Spiral width of 15 mm was possible under the air pressure of more than 0.35 kgf/cm² and 0.40 kgf/cm² or less.
C: Spiral width of 15 mm was impossible even by controlling the air pressure.

High-Speed Line Coatability

Furthermore, the high-speed line coatability was evaluated by the air pressure of the spiral spray and the situation of scattering of the applied hot melt adhesive.

A: Hot melt adhesive did not cause scattering under the air pressure of 0.55 kgf/cm².
B: Hot melt adhesive did not cause scattering under the air pressure of 0.50 kgf/cm².
C: Hot melt adhesive caused scattering under the air pressure of 0.40 kgf/cm² or less.

TABLE 1

| | Example | 1 | 2. | 3. | 4. | 5. | 6. | 7. |
|---|---|---|---|---|---|---|---|---|
| A) | A)-1 | 20 | 10 | 10 | | 5 | 5 | |
| | A)-2 | | | | 10 | | | |
| | A)-3 | | | | | | | 10 |
| B) | B)-1 | 10 | 25 | 30 | 25 | | 5 | 25 |
| | B)-2 | | | | | 25 | 20 | |
| C) | C)-1 | 40 | 40 | 40 | 40 | 25 | | 40 |
| | C)-2 | | | | | | 40 | |
| | C)-3 | | | | | 15 | | |
| D) | D)-1 | 30 | 15 | 20 | | | | 25 |
| | D)-2 | | | | | 30 | 30 | |
| | D)-3 | | 10 | | 25 | | | |
| E) | | | | | | 1 | | |
| F) | | 0.5 | 0.5 | 0.5 | 0.5 | 0.5 | 0.5 | 0.5 |
| Total | | 100.5 | 100.5 | 100.5 | 100.5 | 101.5 | 100.5 | 100.5 |
| Melt viscosity | | | | | | | | |
| Viscosity at 140° C. (mPa · s) | | 6,100 | 4,600 | 7,000 | 4,100 | 5,000 | 4,300 | 4400 |
| | | B | A | B | A | A | A | A |
| Viscosity at 160° C. (mPa · s) | | 3,100 | 2,200 | 3,300 | 2,100 | 2,800 | 2,100 | 2,100 |
| | | B | A | B | A | A | A | A |
| Nonwoven fabric/PE film Peel strength (g/25 mm) | | 232 | 223 | 218 | 213 | 233 | 220 | 170 |
| | | A | A | A | A | A | A | B |
| Nonwoven fabric/ Nonwoven fabric Peel strength (g/25 mm) | | 180 | Material Fracture | Material Fracture | Material Fracture | Material Fracture | Material Fracture | 165 |
| | | B | A | A | A | A | A | B |
| Spiral coatability | | | | | | | | |
| Air pressure (kgf/cm²) | | 0.35 | 0.34 | 0.37 | 0.34 | 0.35 | 0.34 | 0.37 |
| Coating temperature (° C.) | | 145 | 137 | 148 | 135 | 142 | 136 | 137 |
| | | A | A | B | A | A | A | B |
| High-speed line coatability | | | | | | | | |
| Air pressure (kgf/cm2) | | 0.50 | 0.55 | 0.55 | 0.55 | 0.55 | 0.55 | 0.50 |
| Coating temperature (° C.) | | 145 | 137 | 148 | 135 | 142 | 136 | 137 |
| | | B | A | A | A | A | A | B |

TABLE 2

| | Comparative Example | 1. | 2. | 3. | 4. | 5. | 6. | 7. |
|---|---|---|---|---|---|---|---|---|
| A) | A)-1 | | | | 10 | 10 | | |
| | A)-2 | | | | | | 10 | 20 |
| | A)-3 | | | | | | | |
| | A)-4 | | | | | | | 25 |
| B) | B)-1 | 45 | | | | | | |
| | B)-2 | | 35 | | | | | |
| | B')-3 | | | 25 | | | | |
| | B')-4 | | | | 25 | | | |
| | B')-5 | | | | | | 10 | 30 |
| | B')-6 | | | | | | 30 | |
| C) | C)-1 | 40 | 40 | 40 | 40 | | | |
| | C)-2 | | | | | | | 55 |

TABLE 2-continued

| Comparative Example | | 1. | 2. | 3. | 4. | 5. | 6. | 7. |
|---|---|---|---|---|---|---|---|---|
| | C)-3 | | | | | | | |
| | C)-4 | | | | | 43 | 43 | |
| | C)-5 | | | | | 7 | 7 | |
| D) | D)-1 | 15 | | 25 | 25 | | | |
| | D)-2 | | | | | | | |
| | D)-3 | | 25 | | | | | 20 |
| E) | | | | | | | | |
| F) | | 0.5 | 0.5 | 0.5 | 0.5 | 0.5 | 0.5 | 0.5 |
| Total | | 100.5 | 100.5 | 100.5 | 100.5 | 100.5 | 100.5 | 100.5 |

Melt viscosity

| | 1. | 2. | 3. | 4. | 5. | 6. | 7. |
|---|---|---|---|---|---|---|---|
| Viscosity at 140° C. (mPa·s) | 4,200 | 7,300 | 500 | 4,800 | 9,100 | 38,000 | 3,925 |
| | A | B | x | A | B | x | A |
| Viscosity at 160° C. (mPa·s) | 2,100 | 3,700 | 300 | 2,500 | 2,100 | 13,500 | 1,585 |
| | A | B | x | A | A | x | A |

Nonwoven fabric/PE film

| | 1. | 2. | 3. | 4. | 5. | 6. | 7. |
|---|---|---|---|---|---|---|---|
| Peel strength (g/25 mm) | 37 | 107 | 33 | 168 | 100 | 35 | 222 |
| | x | x | x | B | x | x | A |

Nonwoven fabric/Nonwoven fabric

| | 1. | 2. | 3. | 4. | 5. | 6. | 7. |
|---|---|---|---|---|---|---|---|
| Peel strength (g/25 mm) | 158 | Material Fracture | 165 | 133 | Material Fracture | Material Fracture | 178 |
| | B | A | B | x | A | A | B |

Spiral coatability

| | 1. | 2. | 3. | 4. | 5. | 6. | 7. |
|---|---|---|---|---|---|---|---|
| Air pressure (kgf/cm²) | 0.34 | 0.37 | — | 0.4 | — | — | 0.34 |
| Coating temperature (° C.) | 136 | 158 | 125 | 139 | 150 | >180 | 137 |
| | B | B | x | B | x | x | A |

High-speed line coatability

| | 1. | 2. | 3. | 4. | 5. | 6. | 7. |
|---|---|---|---|---|---|---|---|
| Air pressure (kgf/cm²) | 0.55 | 0.55 | — | 0.55 | — | — | 0.45 |
| Coating temperature (° C.) | 136 | 158 | 125 | 139 | 150 | >180 | 137 |
| | A | A | x | A | x | x | x |

As shown in Table 1, the hot melt adhesives of Examples 1 to 7 is suited for spiral coating because of low melt viscosity at 140° C., and they can be used in a high-speed line since scattering is less likely to arise under high hot air pressure, and is also excellent in peel strength to a nonwoven fabric (nonwoven fabric/nonwoven fabric, nonwoven fabric/PE film). Therefore, the hot melt adhesives of Examples 1 to 7 are suitable for disposable products such as a diaper and sanitary products, which are typical nonwoven fabric products.

As shown in Table 2, the hot melt adhesives of Comparative Examples 1 to 7 are inferior in any one of melt viscosity, coatability and peel strength as compared with the adhesives of Examples 1 to 5. The hot melt adhesives of Examples 1 to 7 are more suitable for disposable products as compared with the hot melt adhesives of Comparative Examples 1 to 7.

The invention claimed is:

1. A hot melt adhesive comprising:
    a polymer component consisting of: (A) 3 to 30 parts by weight of a thermoplastic styrene block copolymer having a styrene content of less than 20 wt %; and (B) greater than 20 to 35 parts by weight of a propylene homopolymer having a melting point of 80° C. or lower that is prepared by polymerizing propylene with a metallocene catalyst;
    (C) a tackifier resin;
    (D) a plasticizer; and
    an additive, the additive comprising a stabilizing agent, filler, or mixtures thereof,
    wherein all parts by weight are based on 100 parts by weight of the total weight of components (A) to (D).

2. The hot melt adhesive according to claim 1, wherein the adhesive has a melt viscosity of 2,000 to 7,000 mPa·s at 140° C.

3. The hot melt adhesive according to claim 1, wherein the thermoplastic styrene block copolymer (A) is selected from the group consisting of (A1) a hydrogenated styrene-butadiene block copolymer (SEBS), (A2) a hydrogenated styrene-isoprene block copolymer (SEPS), and mixtures thereof.

4. The hot melt adhesive according to claim 3, wherein the styrene content is from 10 to 15% by weight of the thermoplastic styrene block copolymer.

5. The hot melt adhesive according to claim 1, wherein the propylene homopolymer is selected from the group consisting of (B1) a propylene homopolymer having a weight average molecular weight of 60,000 or less, (B2) a propylene homopolymer having a weight average molecular weight of more than 60,000, and mixtures thereof.

6. The hot melt adhesive according to claim 5, wherein the propylene homopolymer has a polydispersity (Mw/Mn) of 1 to 3.

7. The hot melt adhesive according to claim 1, wherein the plasticizer is (D1) a naphthene oil or (D2) a paraffin oil.

8. The hot melt adhesive according to claim 7, wherein the tackifier resin is a hydrogenated dicyclopentadiene-based resin.

9. The hot melt adhesive according to claim 7, further comprising an olefin wax that has been modified with carboxylic acid or carboxylic anhydride.

10. The hot melt adhesive according to claim 9, wherein the carboxylic acid or carboxylic anhydride is selected from the group consisting of maleic acid, maleic anhydride, fumaric acid, fumaric anhydride, itaconic acid, acrylic acid, methacrylic acid, and mixtures thereof.

11. An article comprising the hot melt adhesive of claim 1, which is a disposable product.

12. The article of claim 11 comprising a substrate selected from the group consisting of woven fabric, a nonwoven fabric, a rubber, a resin, papers and polyolefin film.

13. The article of claim 12, wherein the substrate is polyolefin film.

14. The article of claim 11 which is a paper diaper, a sanitary napkin, a pet sheet, a hospital gown or surgical garment.

* * * * *